United States Patent
Wang et al.

(10) Patent No.: US 10,521,051 B2
(45) Date of Patent: Dec. 31, 2019

(54) POSITION BASED JITTER REMOVAL

(71) Applicant: SYNAPTICS INCORPORATED, San Jose, CA (US)

(72) Inventors: Ying Wang, Fremont, CA (US); Earl Peng, Cupertino, CA (US); Jingwei Tan, Shenzhen (CN)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/562,865

(22) PCT Filed: Mar. 31, 2016

(86) PCT No.: PCT/CN2016/078096
§ 371 (c)(1),
(2) Date: Sep. 28, 2017

(87) PCT Pub. No.: WO2017/121041
PCT Pub. Date: Jul. 20, 2017

(65) Prior Publication Data
US 2018/0307373 A1  Oct. 25, 2018

Related U.S. Application Data (60) Provisional application No. 62/278,898, filed on Jan. 14, 2016.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0414* (2013.01)

(58) Field of Classification Search
CPC ....... G06F 3/0414; G06F 3/0418; G06F 3/044
See application file for complete search history.

(56) References Cited

U.S. PATENT DOCUMENTS

| 8,253,697 | B2 | 8/2012 | Fleck et al. |
| 8,294,687 | B1 | 10/2012 | Ksondzyk |
| 8,766,944 | B2 | 7/2014 | Ksondzyk |
| 9,262,002 | B2 | 2/2016 | Momeyer et al. |

(Continued)

FOREIGN PATENT DOCUMENTS

| CN | 101825968 A | 9/2010 |
| CN | 102012763 A | 4/2011 |

(Continued)

OTHER PUBLICATIONS

PCT/CN2016/078096—International Search Report dated Dec. 26, 2016 consists of 12 pages.

(Continued)

*Primary Examiner* — Viet D Pham
(74) *Attorney, Agent, or Firm* — Paradice & Li LLP (57) ABSTRACT

An input device (100) is configured to detect force being applied to an input region (120) of the device (100) by an input object (140), in addition to the position of the input object (140) using touch sensing methods. The input device (100) applies a position-based jitter force filter to the force sensor data to compensate for a non-uniform response across the input device (100), as well as the movement of an input object (140).

20 Claims, 7 Drawing Sheets

(56) References Cited

U.S. PATENT DOCUMENTS

| | | | |
|---|---|---|---|
| 2006/0293864 A1* | 12/2006 | Soss | G06F 3/0414 |
| | | | 702/104 |
| 2008/0289887 A1* | 11/2008 | Flint | G06F 3/0414 |
| | | | 178/18.03 |
| 2009/0243817 A1* | 10/2009 | Son | G06F 3/0414 |
| | | | 340/407.2 |
| 2010/0278518 A1 | 11/2010 | Gordon | |
| 2011/0037721 A1 | 2/2011 | Cranfill et al. | |
| 2011/0054810 A1 | 3/2011 | Turner et al. | |
| 2011/0074694 A1 | 3/2011 | Rapp et al. | |
| 2011/0141052 A1 | 6/2011 | Bernstein et al. | |
| 2011/0141053 A1 | 6/2011 | Bulea et al. | |
| 2012/0068970 A1 | 3/2012 | Pemberton-Pigott | |
| 2012/0139864 A1 | 6/2012 | Sleeman et al. | |
| 2012/0249476 A1 | 10/2012 | Schwartz et al. | |
| 2013/0076646 A1 | 3/2013 | Krah et al. | |
| 2013/0147850 A1 | 6/2013 | Li et al. | |
| 2014/0267134 A1 | 9/2014 | Bulea et al. | |
| 2014/0292699 A1 | 10/2014 | Ando | |
| 2014/0292705 A1 | 10/2014 | Tan et al. | |
| 2015/0091820 A1 | 4/2015 | Rosenberg et al. | |
| 2015/0363019 A1 | 12/2015 | Schediwy et al. | |

FOREIGN PATENT DOCUMENTS

| | | |
|---|---|---|
| CN | 102681725 A | 9/2012 |
| CN | 203933865 U | 11/2014 |
| JP | 2015118445 A | 6/2015 |

OTHER PUBLICATIONS

PCT/CN2016/078096—Corrected International Search Report dated Jan. 5, 2017, consists of 9 pages.

* cited by examiner

POSITION BASED JITTER REMOVAL

CROSS-REFERENCE TO RELATED APPLICATION(S)

This application claims the benefit of U.S. Provisional Application No. 62/278,898, filed Jan. 14, 2016, the entire contents of which are incorporated by reference herein.

BACKGROUND

Field of the Disclosure

Embodiments of disclosure generally relate to capacitive sensing and, more particularly, sensing force on an input surface using capacitive sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments of the present disclosure provide a method of operating a sensing device comprising a plurality of sensor electrodes. The method includes acquiring position sensor data and force sensor data using at least one of the plurality of sensor electrodes. The method further includes determining a first input parameter for a first input object in contact with the sensing device based on the position sensor data, and applying a jitter force filter to modify the force sensor data based on the first input parameter. The method includes determining force information of the input object based on the modified force sensor data.

Another embodiment of the present disclosure includes an input device having a plurality of sensor electrodes, and a processing system coupled to the plurality of sensor electrodes. The processing system is configured to acquire capacitive sensor data and force sensor data using at least one of the plurality of sensor electrodes, and determine a first input parameter of an input object in contact with the input device based on the capacitive sensor data. The processing system is further configured to apply a jitter force filter to at least a portion of the force sensor data to determine modified force sensor data, wherein the jitter force filter is at least partially based on the first input parameter. The processing system is further configured to determine force information of the input object based on the modified force sensor data.

One embodiment of the present disclosure includes a processing system for a sensing device. The processing system includes sensor circuitry coupled to a plurality of sensor electrodes, and the sensor circuitry is configured to acquire position sensor data and force sensor data using at least one of the plurality of sensor electrodes. The processing system is configured to determine a first input parameter of the input object contacting of the sensing device, and apply a jitter force filter to at least a portion of the force sensor data to determine modified force sensor data, wherein the jitter force filter is at least partially based on the first input parameter. The processing system is further configured to determine force information of the input object based on the modified force sensor data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Input devices having a force detector are generally based on a bending effect caused by a force applied to the input device by an input object. The bending results in a deflection from equilibrium of at least a portion of the sensor electrodes in the input device. For example, in some embodiments, the deflection of sensor electrode(s) due to the applied force changes the distance between at least one of the sensor electrodes and the one or more force receiver electrodes, which can be detected as a change in capacitance. Due to the mechanical nature of the bending effect, the same force applied at different positions on the input surface can report different force levels. For example, force sensor data corresponding to the center of the input surface may be elevated relative to data from the edges or corners of the input surface. To address this problem, position compensation is applied when determining force level information using the force sensor data.

However, it has been determined that position compensation techniques not only affect the force level information but also affects jitter effects within the force sensor data. Jitter within force sensor data can arise from a variety of sources, including mechanical changes to the device over time, electronics noise, and from minute variations in force applied by a user. That is, existing position compensation techniques elevate the jitter effect within force sensor data corresponding to the edges or corners of the input surface compared to the jitter effects from the center, which can lead to inaccurate sensing operations. Similarly, jitter can also affect force sensor data corresponding to a moving input object (e.g., moving across a touch screen). Accordingly, embodiments of the present disclosure provide a processing system that applies a jitter force filter to force sensor data to more accurately determine force information corresponding to an input object.

Figure 1:
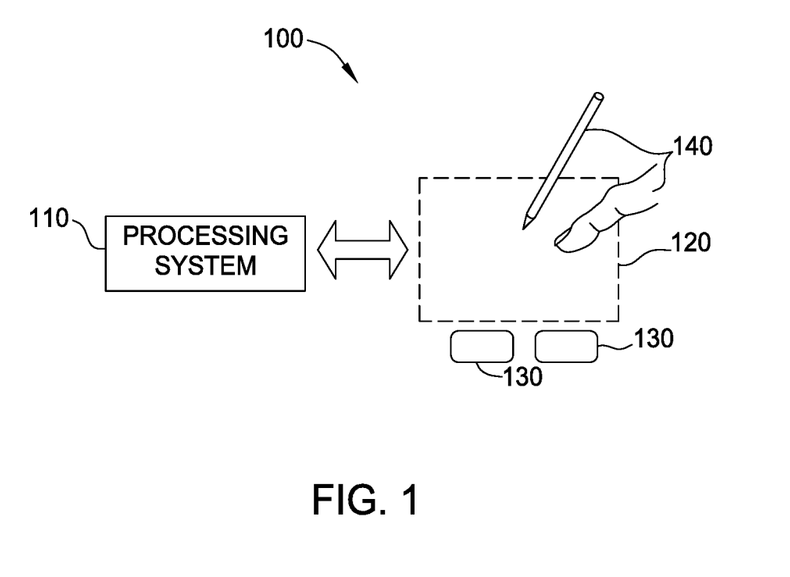
FIG. 1 is a block diagram of an exemplary input device, according to one embodiment described herein.

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
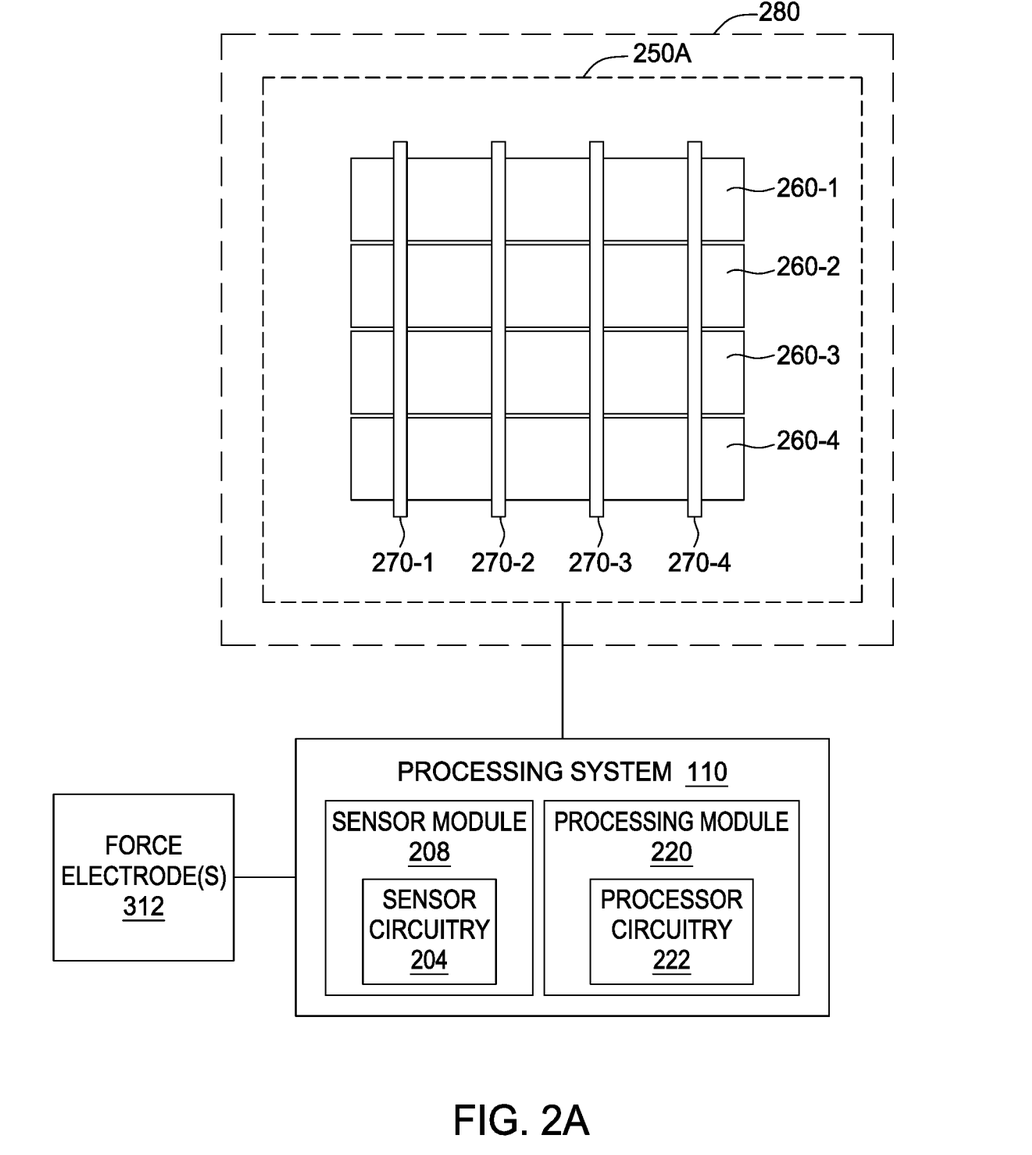
FIGS. 2A-2B illustrate portions of exemplary patterns of sensing elements according to embodiments described herein.

FIG. 2A illustrates a portion of an exemplary pattern of sensing elements according to some embodiments. For clarity of illustration and description, FIG. 2A shows the sensing elements in a pattern of simple rectangles and does not show various components, such as various interconnects between the sensing elements and the processing system 110. An electrode pattern 250A comprises a first plurality of sensor electrodes 260 (260-1, 260-2, 260-3, . . . 260-n), and a second plurality of sensor electrodes 270 (270-1, 270-2, 270-3, . . . 270-m) disposed over the first plurality of electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. Further processing system 110 receives resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250A can be coupled to the processing system 110.

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

The processing system 110 can include a sensor module 208 having sensor circuitry 204. The sensor module 208 operates the electrode pattern 250A receive resulting signals from electrodes in the electrode pattern using a capacitive sensing signal having a sensing frequency. The processing system 110 can include a processing module 220 configured to determine capacitive measurements from the resulting signals. The processing module 220 can include processor circuitry 222, such as a digital signal processor (DSP), microprocessor, or the like. The processing module 220 can include software and/or firmware configured for execute by the processor circuitry 222 to implement the functions described herein. Alternatively, some or all of the functions of the processor module 220 can be implemented entirely in hardware (e.g., using integrated circuitry). The processing module 220 can track changes in capacitive measurements to detect input object(s) in the sensing region 120. The processing system 110 can include other modular configurations, and the functions performed by the sensor module 208 and the processing module 220 can, in general, be performed by one or more modules or circuits in the processing system 110. The processing system 110 can include other modules and circuits, and can perform other functions as described in some embodiments below.

The processing system 110 can operate in absolute capacitive sensing mode or transcapacitive sensing mode. In absolute capacitive sensing mode, receiver(s) in the sensor circuitry 204 measure voltage, current, or charge on sensor electrode(s) in the electrode pattern 250A while the sensor electrode(s) are modulated with absolute capacitive sensing signals to generate the resulting signals. The processing module 220 generates absolute capacitive measurements from the resulting signals. The processing module 220 can track changes in absolute capacitive measurements to detect input object(s) in the sensing region 120.

In transcapacitive sensing mode, transmitter(s) in the sensor circuitry 204 drive one or more of the first plurality of electrodes 260 with the capacitive sensing signal (also referred to as a transmitter signal or modulated signal in the transcapacitive sensing mode). Receiver(s) in the sensor circuitry 204 measure voltage, current, or charge on one or more of the second plurality of electrodes 270 to generate the resulting signals. The resulting signals comprise the effects of the capacitive sensing signal and input object(s) in the sensing region 120. The processing module 220 generates transcapacitive measurements from the resulting signals. The processing module 220 can track changes in transcapacitive measurements to detect input object(s) in the sensing region 120.

In some embodiments, the processing system 110 "scans" the electrode pattern 250A to determine capacitive measurements. In the transcapacitive sensing mode, the processing system 110 can drive the first plurality of electrodes 260 to transmit transmitter signal(s). The processing system 110 can operate the first plurality of electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 270 to be independently determined. In the absolute capacitive sensing mode, the processing system 110 can receive resulting signals from one sensor electrode 260, 270 at a time, or from a plurality of sensor electrodes 260, 270 at a time. In either mode, the processing system 110 can operate the second plurality of electrodes 270 singly or collectively to acquire resulting signals. In absolute capacitive sensing mode, the processing system 110 can concurrently drive all electrodes along one or more axes. In some examples, the processing system 110 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region 120. For example, the processing system 110 can use successive capacitive images acquired over successive periods of time to track the motion(s) of one or more input objects entering, exiting, and within the sensing region 120.

In absolute capacitive sensing mode, the processing system 110 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 110 can acquire multiple capacitive profiles along one or both of the axes over multiple time periods and can determine differences between capacitive profiles to derive information about input in the sensing region 120. For example, the processing system 110 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The processing module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device 280 used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having the sensor module 208, the processing module 220, and any other module(s) and/or circuit(s). In another embodiment, the processing system 110 can include a plurality of integrated circuits, where the sensor module 208, the processing module 220, and any other module(s) and/or circuit(s) can be divided among the integrated circuits. For example, the sensor module 208 can be on one integrated circuit, and the processing module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules such as a display driver module and/or a display driver module.

Figure 2B:
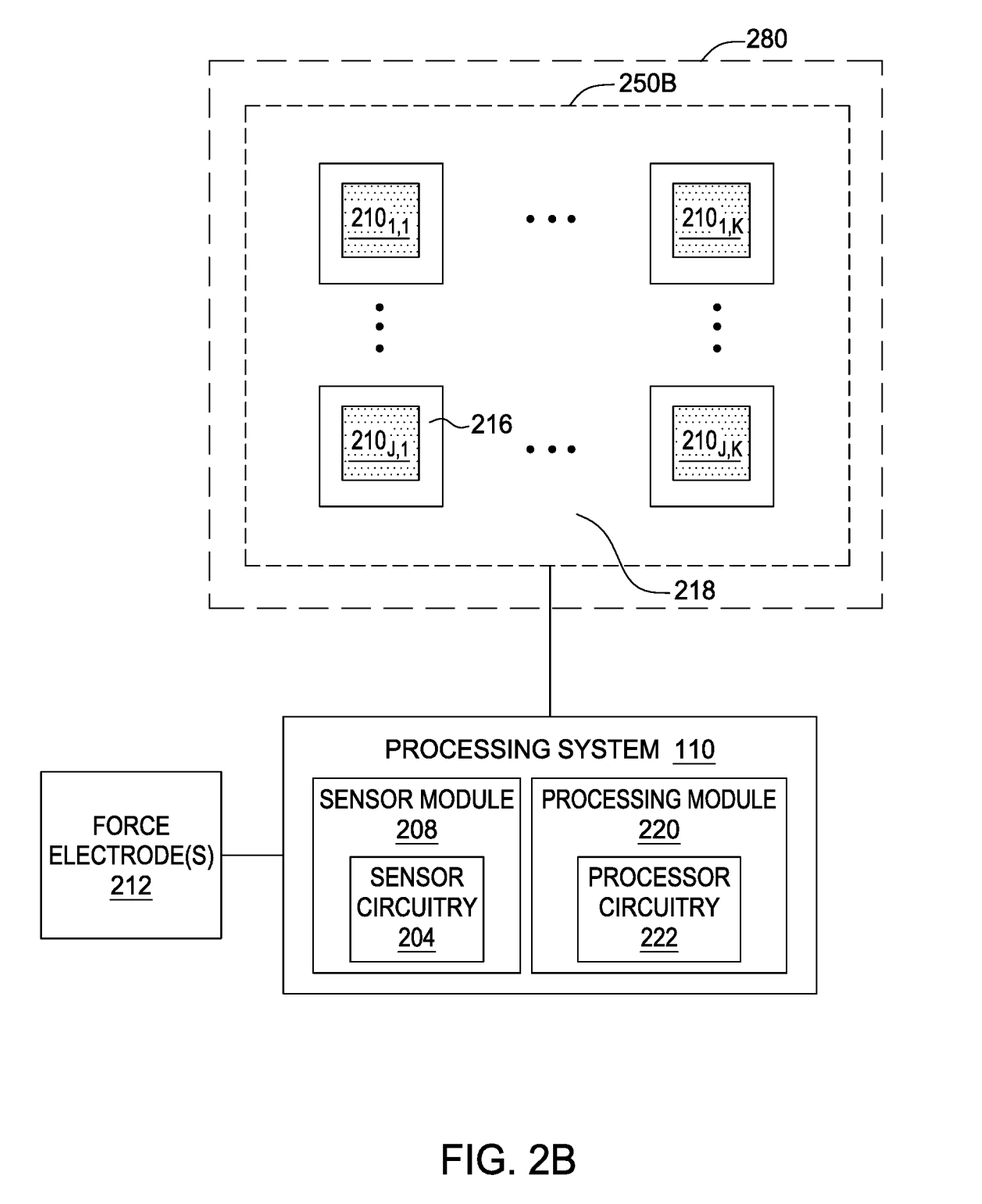

FIG. 2B illustrates a portion of another exemplary pattern of sensing elements according to some embodiments. For clarity of illustration and description, FIG. 2B presents the sensing elements in a matrix of rectangles and does not show various components, such as various interconnects between the processing system 110 and the sensing elements. An electrode pattern 250B comprises a plurality of sensor electrodes 210 disposed in a rectangular matrix. The electrode pattern 250B comprises sensor electrodes $210_{J,K}$ (referred to collectively as sensor electrodes 210) arranged in J rows and K columns, where J and K are positive integers, although one or J and K may be zero. It is contemplated that the electrode pattern 250B may comprise other patterns of the sensor electrodes 210, such as polar arrays, repeating patterns, non-repeating patterns, non-uniform arrays a single row or column, or other suitable arrangement. Further, the sensor electrodes 210 may be any shape, such as circular, rectangular, diamond, star, square, nonconvex, convex, non-concave concave, etc. Further, the sensor electrodes 210 may be sub-divided into a plurality of distinct sub-electrodes. The electrode pattern 250 is coupled to the processing system 110.

The sensor electrodes 210 are typically ohmically isolated from one another. Additionally, where a sensor electrode 210 includes multiple sub-electrodes, the sub-electrodes may be ohmically isolated from each other. Furthermore, in one embodiment, the sensor electrodes 210 may be ohmically isolated from a grid electrode 218 that is between the sensor electrodes 210. In one example, the grid electrode 218 may surround one or more of the sensor electrodes 210, which are disposed in windows 216 of the grid electrode 218. In some embodiments, the electrode pattern 250B can include more than one grid electrode 218. In some embodiments, the grid electrode 218 can have one or more segments. The grid electrode 218 may be used as a shield or to carry a guarding signal for use when performing capacitive sensing with the sensor electrodes 210. Alternatively or additionally, the grid electrode 218 may be used as sensor electrode when performing capacitive sensing. Furthermore, the grid electrode 218 may be co-planar with the sensor electrodes 210, but this is not a requirement. For instance, the grid electrode 218 may be located on a different substrate or on a different side of the same substrate as the sensor electrodes 210. The grid electrode 218 is optional and in some embodiments, the grid electrode 218 is not present.

In a first mode of operation, the processing system 110 can use at least one sensor electrode 210 to detect the presence of an input object via absolute capacitive sensing. The sensor module 208 can measure voltage, charge, or current on sensor electrode(s) 210 to obtain resulting signals indicative of a capacitance between the sensor electrode(s) 210 and an input object. The processing module 220 uses the resulting signals to determine absolute capacitive measurements. When the electrode pattern 250B, the absolute capacitive measurements can be used to form capacitive images.

In a second mode of operation, the processing system 110 can use groups of the sensor electrodes 210 to detect presence of an input object via transcapacitive sensing. The sensor module 208 can drive at least one of the sensor electrodes 210 with a transmitter signal, and can receive a resulting signal from at least one other of the sensor electrodes 210. The processing module 220 uses the resulting signals to determine transcapacitive measurements and form capacitive images.

The input device 100 may be configured to operate in any one of the modes described above. The input device 100 may also be configured to switch between any two or more of the modes described above. The processing system 110 can be configured as described above with respect to FIG. 2A.

In some embodiments, the processing system 110 is further configured to determine force information for an input object. As shown in FIGS. 2A-2B, the processing system 110 can be further coupled to one or more force electrodes 212. The processing system 110 can determine the force information in response to capacitive measurements obtained using sensor electrodes of the input device 100, one or more force electrode(s) 212, or a combination of both. For example, transcapacitive measurements can be obtained between the sensor electrodes integrated within a display device of the input device 100 and/or a dedicated force receiver electrode. In another example embodiment, self-capacitive measurements can be obtained using the sensor electrodes and/or the force electrode 212. The sensor electrodes of the input device 100 can bend in response to a force applied by an input object. The bending results in a deflection from equilibrium of at least a portion of the sensor electrodes integrated within the display device. The deflection of sensor electrode(s) due to the applied force changes the distance between at least one of the sensor electrodes and the one or more force receiver electrodes, which can be detected as a change in transcapacitance. The force information can include a "force image", "force profile", or a scalar force value, depending on the configuration of the sensor electrodes and the force electrodes 212. The force information can be combined with position information to determine both position of an input object and a force applied by the input object.

Figure 3:
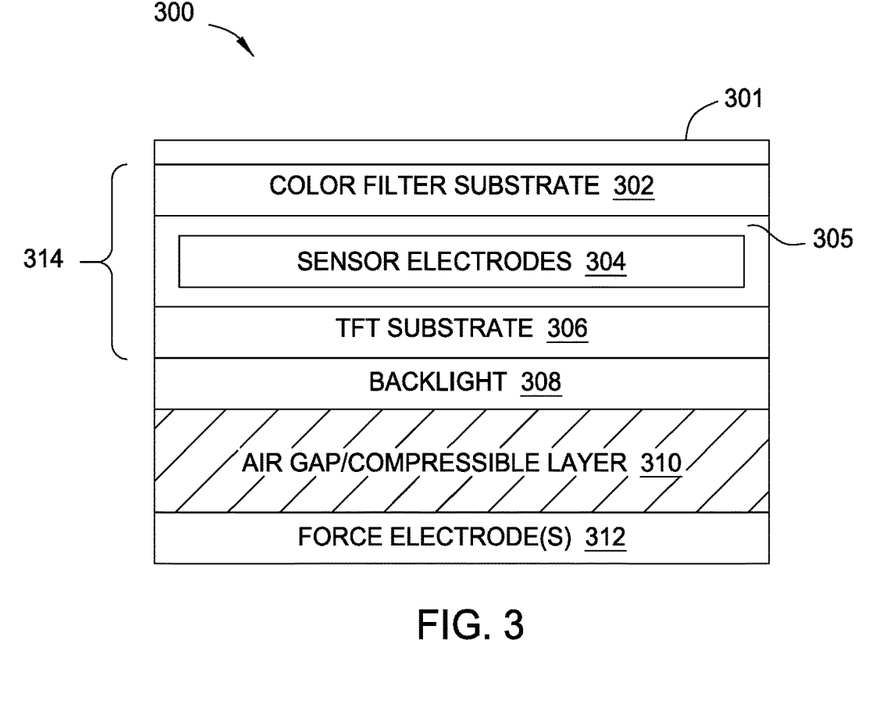
FIG. 3 is a block diagram depicting a cross-section of an input device according to an embodiment.

FIG. 3 is a block diagram depicting a cross-section 300 of the input device 100 according to an embodiment. The input device 100 includes an input surface 301, a display cell 314, a backlight 308, an air gap/compressible layer 310, and at least one force electrode 312. The input surface 301 can include a transparent substrate, such as a glass substrate. The force electrode(s) 312 can be metal electrode(s). In some embodiments, the force electrode 312 can be a conductive, structural element of the input device 100 which is re-used (e.g., as a ground) for influencing capacitive measurements to obtain force information. In other embodiments, the force electrode(s) 312 is a dedicated force receiver electrode(s) configured for capturing transcapacitive measurements to obtain force information. In yet other embodiments, the force electrode(s) 312 may be dedicated force transmitter electrode(s) configured to transmit transmitter signals to be received by one or more receiver electrodes to obtain force information. Further, the force sensor electrode(s) 312 may comprise one or more transmitter electrodes and one or more receiver electrodes, where one or more transmitter electrodes are configured to move toward one or more of the receiver electrodes, or one or more of the receiver electrodes are configured to move toward one or more of the transmitter electrodes. In further embodiments, the force electrodes(s) 312 may be configured for absolute capacitive sensing and configured to detect movement of one or more conductors toward the force electrode(s) 312 or movement of one or more sensor electrode(s) 312 toward one or more conductors when force is applied to obtain force information. The force sensor electrode(s) 312 may be one large conductive electrode or disposed as a plurality of force sensing electrodes in any pattern. Further, the force sensor electrode(s) 312 may be disposed in pairs, where one force sensor electrode is configured to move closer to another force sensor electrode.

There may be any number of pairs of force sensing electrodes which may be disposed at one or more regions of input device 100.

In an embodiment, the display cell 314 includes a color filter substrate 302, inner layers 305, and a thin-film transistor (TFT) substrate 306. The inner layers 305 can include various layers, such as a color filter layer, liquid crystal display (LCD) material layer, conductive layers, dielectric layers, and the like. In particular, the inner layers 305 include one or more conductive layers forming sensor electrodes 304. The color filter substrate 302, the inner layers 305, and the TFT substrate 306 are flexible such that the display cell 314 is flexible.

The sensor electrodes 304 can have various configurations. In one example, the sensor electrodes 304 can include the plurality of sensor electrodes 260 in the sensor electrode pattern 250A. In another example, the sensor electrodes 304 can include the sensor electrodes 210 in the sensor electrode pattern 250B. In any configuration, each of the sensor electrodes 304 comprises at least one common electrode configured for display updating and capacitive sensing.

The display cell 314 is disposed between the input surface 301 and the backlight 308. The display cell 314 is flexible and can flex or bend when force is applied to the input surface 301. In the present example, the force electrode(s) 312 are separated from the backlight 308 by the air gap/compressible layer 310, which can either be an air gap or a layer of compressible material. In other embodiments, the backlight 308 and the air gap/compressible layer 310 may be an integrated layer of insulated light-guide material. Accordingly, according to some embodiments, the sensor electrodes 304 are disposed between the input surface 301 and the force electrode(s) 312. The sensor electrodes 304 are configured to deflect toward the force electrode(s) 312 as the display cell 314 bends into the air gap/compressible layer 310 in response to a force applied to the input surface 301. Depending on the location of the force applied to the input surface 301, at least a portion of the sensor electrodes 304 will deflect toward the force electrode(s) 312 in response to the applied force. While FIG. 3 illustrates one potential embodiment, it should be understood that various other configurations may operate under the principles described herein. For example, the sensor electrodes 304 need not be disposed between the input surface 301 and the force electrodes 312. Further, the force electrodes and sensor electrodes need not be completely distinct sets of electrodes. Some of the sensor electrodes may be used as force electrodes and vice versa. In some embodiments, the same electrodes may be used as both force electrodes and sensor electrodes in order to detect force and input object location in the sensing region, respectively. In some embodiments, for the purpose of force detection, the sensor electrodes may be permanently or temporarily grounded or held at a relatively constant voltage. That is, the force electrodes may deflect relative to an object having a relatively constant voltage to enable the processing system to detect applied force via the force electrodes.

Figure 4:
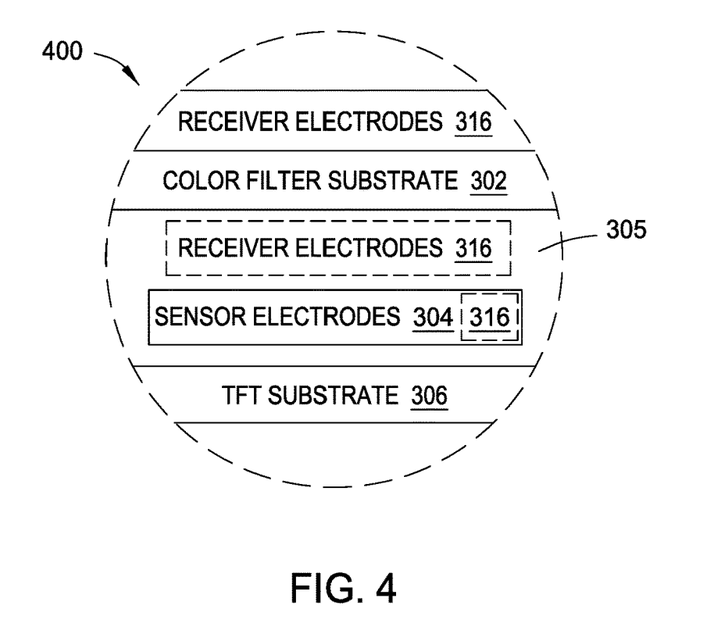
FIG. 4 is a block diagram depicting a cross-section of a display cell according to an embodiment.

FIG. 4 is a block diagram depicting a cross-section of an alternative embodiment of a display cell 400. The display cell 400 can be used in place of the display cell 314. In the display cell 400, receiver electrodes 316 are disposed on the color filter substrate 302. In an embodiment, the sensor electrodes 304 can include the plurality of sensor electrodes 260 operating as transmitter electrodes, and the receiver electrodes 316 can include the plurality of sensor electrodes 270, of the sensor electrode pattern 250A. In another embodiment, the receiver electrodes 316 are disposed within the inner layers 305, rather than on the color filter substrate 302. In yet another embodiment, the receiver electrodes 316 are disposed on the same layer as the sensor electrodes 304. In some embodiments, the matrix sensor electrodes 210 may be operated to detect changes in absolute capacitance as the sensor electrodes 210 move closer to one or more conductors, and/or for absolute capacitance during touch sensing and as either transmitter or receiver electrodes during force sensing to detect how much the sensor electrodes 210 are deflected toward another receiver or transmitter electrode, respectively.

Figure 5:
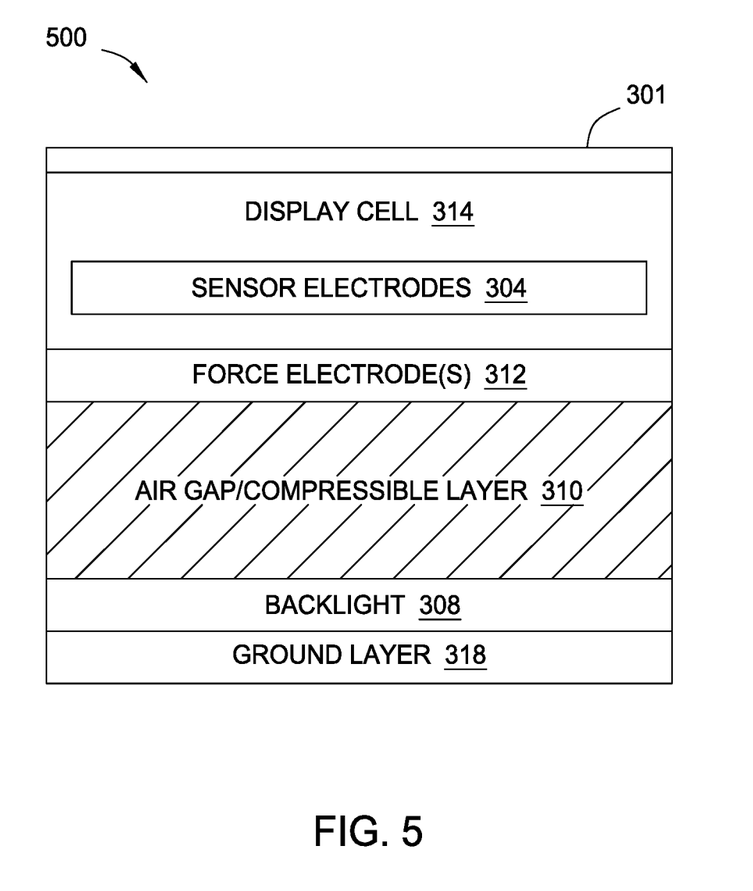
FIG. 5 is a block diagram depicting a cross-section of an input device according to another embodiment.

FIG. 5 is a block diagram depicting a cross-section 500 of the input device 100 according to another embodiment. In the present embodiment, the force electrode(s) 312 are disposed between the display cell 314 and the backlight 308 (i.e., "below" the display cell 314 and "above" the backlight 308). For example, the force electrode(s) 312 can be disposed below a TFT substrate 306 of the display cell 314. In some embodiments, the force electrode(s) 312 are separated from a ground layer 318, such as a mid-frame component of the input device or other conductive layer of the input device, by the air gap/compressible layer 310. In other embodiments, the force receiver electrode(s) 312 are separated from the display cell 314 by the air gap/compressible layer 310. The display cell 314 can comprise the display cell 314 of FIG. 3, the display cell 400, or the like.

Other types of flexible display cells can be used in the embodiments of FIGS. 3-5, such as an OLED display. In general, the display cell can include display pixels formed from LEDs, OLEDs, plasma cells, electronic ink elements, LCD components, or other suitable display pixel structures compatible with flexible displays. The sensor electrodes 304 are disposed within the display cell and are deflected toward the force electrode(s) 312 when force is applied that bends the flexible display.

Figure 6:
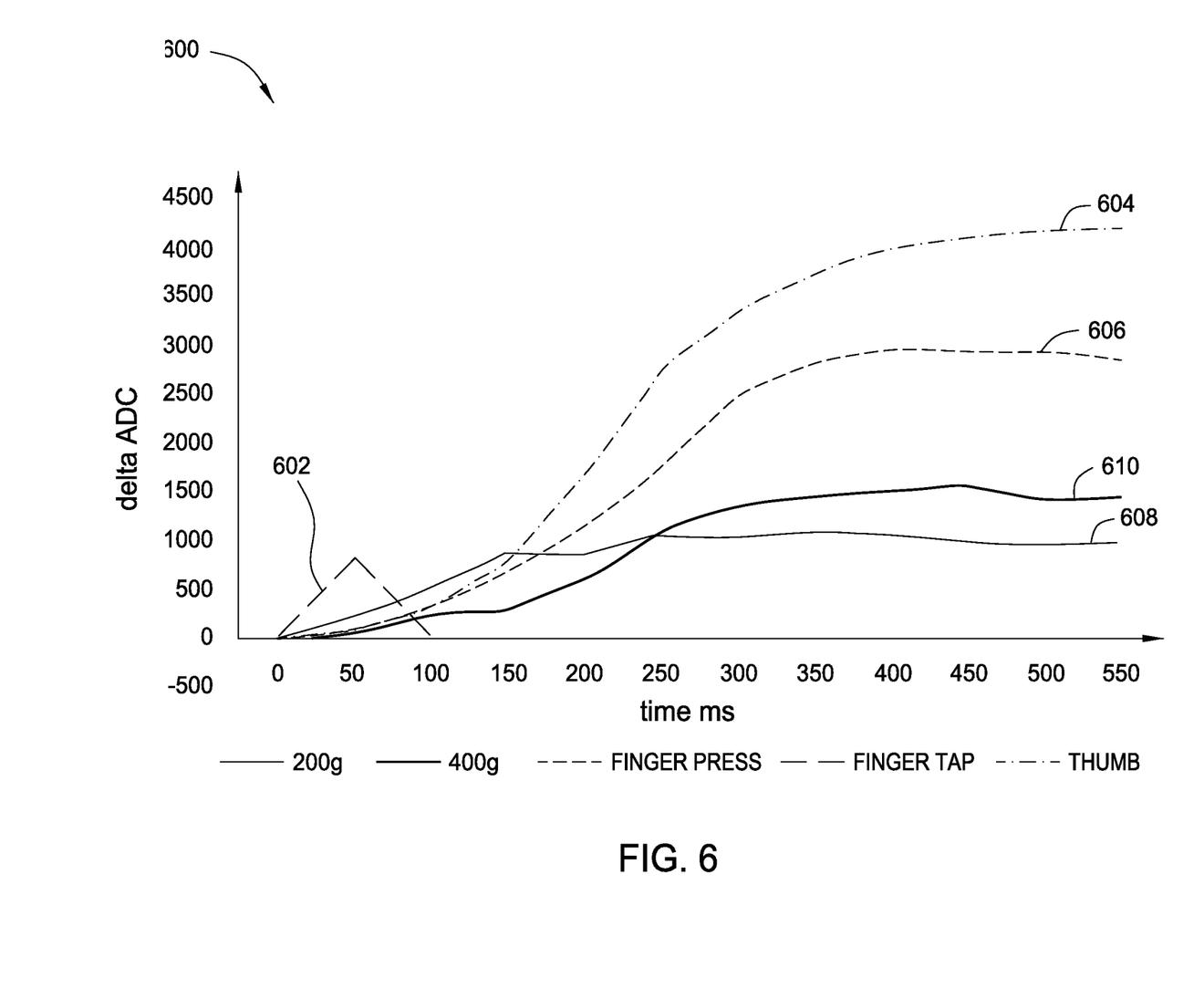
FIG. 6 is a chart diagram depicting a comparison of sensor data resulting from a variety of input objects and/or input forces.

FIG. 6 is a chart diagram 600 depicting a comparison of sensor data resulting from a variety of input objects and/or input forces. The chart diagram 600 plots a series of sensor data (delta ADC) on the Y-axis over time (ms) on the X-axis, assuming each respective input event initiates at t=0. A first graph 602 represents example sensor data resulting from a quick touch input, such as a finger tap, on an input surface of a force sensing device. As shown in FIG. 6, the sensor data indicates a fast change stage, peaking at about t=50 ms and subsiding by t=100 ms.

In comparison, graphs 604 and 606 represent example sensor data resulting from contact of input objects, such as a thumb press or finger press, respectively, to the input surface of the force sensing device. As shown in FIG. 6, the sensor data of graphs 604 and 606 changes more slowly compared to the first graph 602, because mechanical change and its corresponding bending effect takes place at around t=150 ms to t=400 ms. This delay is further evidenced by graphs 608 and 610, representing example force sensor data resulting from a pre-determined input force, 200 grams and 400 grams respectively, applied to the input surface of the force sensing device.

Accordingly, embodiments of the present disclosure include a jitter force filter that modifies force sensor data, such that the filtered result is calculated from current sensor data and from a previously filtered result. In some embodiments, the jitter force filter is an infinite impulse response (IIR) filter or similar filter. In some implementations, the jitter force filter may be implemented as software executed by the processing system 110. In other implementations, the jitter force filter may be implemented as an analog electronics device integrated as part of a signal processing pipeline of the processing system 110. The jitter force filter is configured such that, when a change in sensor data is "fast", the current value takes more weight; meanwhile when a change in the sensor data is slow, the current value takes less weight. Using such a jitter force filter enables embodiments of the present disclosure to correct for jitter effects, while avoiding delays in the fast change stages of the sensor response, as illustrated in FIG. 6.

Figure 7:
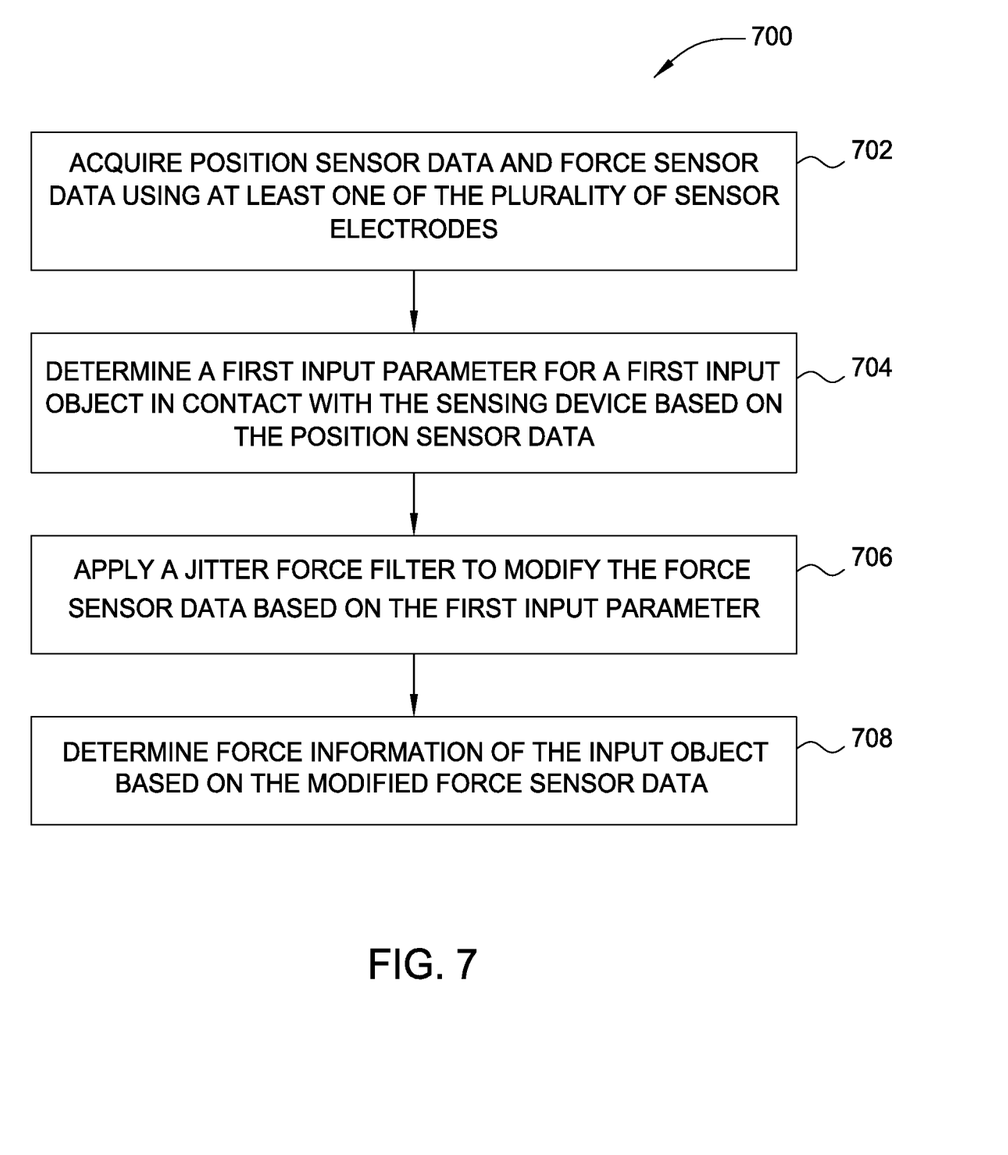
FIG. 7 is a flow diagram depicting a method of operating a force sensing input device, according to an embodiment.

FIG. 7 is a flow diagram depicting a method 700 of operating a force sensing input device according to an embodiment. The method 700 can be performed by the processing system 110 described above to determine force information or both force information and position information for an input object interacting with the input device 100. In an embodiment, processing system 110 performs all or a portion of the method 700 during a non-display update time, such as a vertical blanking time or a horizontal blanking time. In another embodiment, the non-display update time can be a long horizontal blanking period that occurs between display line updates of a display frame and is at least as long as the display line update period. In some embodiments, one non-display update period can be used for force sensing and other non-display update period can be used for touch sensing, The method 700 begins at step 702, where the processing system 110 acquires position sensor data and force sensor data using at least one of a plurality of sensor electrodes of the sensing device. The processing system 110 applies position compensation to the force sensor data to compensate for different sensor responses in different areas of the sensing device due to the mechanical nature of the bending effect. As mentioned above, the position compensation techniques can increase jitter effects throughout the force sensor data.

In some embodiments of a force sensing input device, the plurality of sensor electrodes includes one force sensor electrode that is moved closer to (i.e., deflected towards) another force sensor electrode in response to a force applied to the sensing device. In such embodiments, the processing system 110 can acquire force sensor data using transcapacitive sensing methods based on the capacitive coupling between the force electrodes by driving one force sensor electrode with a force sensing signal, receiving resulting signals from the other force sensor electrode acting as a receiver, and determining changes in transcapacitance relative to a state in which no force is applied to the sensing device.

For example, the processing system 110 may drive the sensor electrodes 304 with force sensing signals. The force sensing signals comprise modulated signals, which are capacitively coupled to the force electrode(s) 312, i.e., as receiver electrodes. For example, if the input device 100 includes the sensor electrode pattern 250A, the sensor circuitry 204 can drive the sensor electrodes 260 with force sensing signals. In another example, if the input device 100 includes the sensor electrode pattern 250B, the sensor circuitry 204 can drive the sensor electrodes 210 with force sensing signals. The processing system 110 then receives resulting signals from the force electrodes(s) 312. For example, the sensor circuitry 204 can measure voltage, current, or charge on the force receiver electrode(s) 312 to generate the resulting signals. The resulting signals comprise the effects of the force sensing signal and any deflection of the sensor electrodes 304 due to force applied to the input device 100. The processing system 110 can scan the force receiver electrodes 312 to receive the resulting signals in a manner similar to transcapacitive position sensing described above.

In similar embodiments, the processing system 110 may be configured to acquire force sensor data by driving one designated force sensor electrode as an absolute capacitive sensor, driving the other force sensor electrode with a constant voltage, and measuring changes in absolute capacitance. For example, the processing system 110 may obtain force sensor data from the force electrode(s) 312 using "self capacitance" (or "absolute capacitance") sensing methods based on the capacitive coupling between force electrodes 312 and a conductive layer on the other side of the air gap/compressible layer 310. Any change in distance between the force electrode(s) and some conductive layer of the capacitive sensing device results in a change in the absolute capacitive values.

In other embodiments of a force sensing input device, the plurality of sensor electrodes includes one or more sensor electrodes that are configured for touch sensing, is "re-used" for force sensing, and is moved closer to another sensor electrode in response to a force input. In these embodiments, the processing system 110 can drive one sensor electrode as a transmitter, drive another as a receiver, and determine a measure of transcapacitance. In other embodiments, the processing system 110 can drive one sensor electrode as an absolute capacitive sensor, drive the other with a constant voltage, and determine a measure of absolute capacitance, as described above.

At step 704, the processing system 110 determines a first input parameter for a first input object in contact with the sensing device based on the position sensor data. In one embodiment, the first input parameter is based on positions or locations within an input region of the sensing device from which the force sensor data is acquired. In other embodiments, the first input parameter is based on movement of the input object in contact with the sensing device, as described in greater detail below.

At step 706, the processing system 110 applies a jitter force filter to modify the force sensor data based on the first input parameter. In some embodiments, the jitter force filter modifies at least a portion of, or all of, the force sensor data based on the first input parameter. In other embodiments, the jitter force filter modifies only the portion of force sensor data corresponding to the force sensor elements near the contact location of the input object. The force sensor data filtered by the jitter force filter can be raw sensor data or processed sensor data, such as sensor data that has already been modified by position compensation.

In some embodiments, the first input parameter varies based on a contact location of the input object within an input region of the input device. In some embodiments, the first input parameter varies between one contact location that is proximate to an edge of the input region and another contact location is proximate to a center of the input region. For example, the first input parameter may be selected such that a stronger jitter force filter is applied to force sensor data from the corners and edges compared to the jitter force filter applied to force sensor data from the center of the sensing device.

In some embodiments, the first input parameter corresponds to a contact location of the input object with respect to an input region of the sensing device. For example, for a sensing device having a defined rectangular input region, the first input parameter may represent the position of the input object within that region at which the input object contacts the sensing device. In some embodiments, the input parameter for position may be represented using a coordinate system (e.g., x-y). In another embodiment, the input region of the force sensing device may be divided into a plurality of regions, and the input parameter corresponds to one of those regions.

In embodiments of the force sensing device having force sensing elements, where the plurality of sensor electrodes includes a first sensor electrode configured for force sensing (including both dedicated and re-used force using electrodes), the first input parameter of the jitter force filter can vary based on proximity of a contact location to the first sensor electrode. That is, the application of the jitter force filter to force sensor data from positions closer to where a force sensing element is located may be different from the application of the jitter force filter where a force sensing element is not located.

In one particular embodiment, the jitter force filter may be implemented using an IIR filter, or other similar electronic filter to filter out mechanical and electronics noise from the force sensor data. The jitter force filter applied to modify the force sensor data can be based on an amount of force applied by the input object. With the IIR filter, the use of a feedback input means that the modified force sensor data is calculated from current force sensor data and previously modified force sensor data. An IIR filter for each position ij can be expressed by Equation (1).

$$f_{filtered_{ij}} = \alpha_{ij} f_{filtered_{ij}} + (1-\alpha_{ij}) f_{current_{ij}} \quad (1)$$

In some embodiments, the jitter force filter is based on a rate of change in the force sensor data. The use of factors $\alpha_{ij}$ are selected such that when the rate of change in the force sensor data is fast, the current value takes more weight. Likewise, when the rate of change in the force sensor data is slow, the current value takes less weight. This use of the rate of change can be expressed by Equations (2). As shown below, when the change to the force sensor data ($f_{filtered_{ij}} - f_{current_{ij}}$) increases, the factor $\alpha_{ij}$ decreases, and the jitter force filter modifies the force sensor data more weakly.

$$k_{ij} = mc_{ij} \quad (2)$$

$$\alpha_{ij} = 1 - \frac{|f_{filtered_{ij}} - f_{current_{ij}}|}{mc_{ij}} \quad \text{if } |f_{filtered_{ij}} - f_{current_{ij}}| < mc_{ij}$$

$$\alpha_{ij} = 0 \quad \text{if } |f_{filtered_{ij}} - f_{current_{ij}}| \geq mc_{ij}$$

In Equations (2), $k_{ij}$ represents an overall tuning or scaling factor for the jitter force filter. Assuming the reported force level at location ij before application of the jitter force filter is represented as $f_{ij} = c_{ij} f_{nocompensate_{ij}}$, then the factor $c_{ij}$ represents a position compensation factor corresponding to position ij of the input device. As such, as shown above, when the position compensator $c_{ij}$ increases, the factor $\alpha_{ij}$ increases and the jitter force filter modifies the force sensor data more strongly. In some implementations, the position compensation factor can be represented by a lookup table determined at calibration time, for example, by modeling. For instance, a thin plate bending model or Euler-Bernouli bending beam model can be used.

At step 708, the processing system 110 determines force information of the input object based on the modified force sensor data. In one embodiment, a force image may be determined based on force sensor data, which embody changes in transcapacitance or absolute capacitance and have been modified based on the first input parameter. In some embodiments, the processing system 110 can determine a second input parameter based on the position sensor data, and apply the jitter force filter to further modify the force sensor data based on the second input parameter as well. For example, the processing system 110 can determine a second input parameter corresponding to the movement of the input object, as described below.

Jitter Force Filter for Moving Input Objects

During some operations of the input device, an input object applying a force to the input device ("force input object") may move within an input region of the input device. For example, a user might press on an image displayed by the input device with a finger to trigger a zoom-in functionality, and then move the finger to zoom-in on the image at other positions. Such movement of the force input object may result in force sensor data that suffers from jitter effects as well.

In one or more embodiments, the processing system 110 is configured to apply a filter to capacitive sensor data corresponding to the movement of the force input object (i.e., filter out jitter from the velocity), and then remove the jitter effect during movement of the force input object, as expressed by Equations (3) and (4), respectively. The input of $f_n$ is the output force level of the position-based jitter force filter described herein.

$$v_n = f(v_n, v_{n-1}, v_{n-2}, \ldots) \quad (3)$$

$$f_n = g(v_n, f_n, f_{n-2}, \ldots) \quad (4)$$

In one embodiment, the processing system 110 is configured to determine an input parameter corresponding to the movement of a force input object based on acquired capacitive sensor data. The processing system 110 applies a jitter force filter to modify the force sensor data based on the calculated input parameter. In some embodiments, the processing system 110 may determine at least one of velocity, speed, and a direction of the movement of the force input object. In one implementation, the processing system 110 calculates the velocity of a force input object using Equation (5) below.

$$v_n = \sqrt{(x_n - x_{n-1})^2 + (y_n - y_{n-1})^2} \quad (5)$$

The jitter force filter may be configured such that, when the determined velocity of the input object is low, the reported force level should be equal to or substantially similar to the reported force level resulting from the position-based jitter force filter described above. In response to faster movement of the force input object, the jitter force filter is applied more strongly. In some embodiments, the processing system 110 may implement a number of levels having a corresponding strength of jitter force filter application. For example, the processing system can apply a stronger jitter force filter in response to a "normal" movement of the input object, while a strongest application of the jitter force filter can be applied in response to a "fast" movement. When the processing system 110 determines that a force input object has stopped moving within the input region of the input device, the processing system 110 may continue to apply the jitter force filter to the force sensor data but with a reduced weight on previously filtered force sensor data.

In one particular implementation, the processing system 110 applies an IIR filter, or other similar filter, to the capacitive sensor data corresponding to velocity of the input object, as represented by Equation (6). $v_n$ represents a current velocity measurement, and $v_{n-1}$ represents a previously filtered velocity measurement.

$$v_n = a v_{n-1} + (1-a) v_n \quad (6)$$

The processing system may then apply a jitter force filter to the force sensor data, as represented by Equation (7). The factor b is related to the calculated velocity input parameter, such that if $$f_n = b f_{n-1} + (1-b) f_n$$

$$b_n = k v_n \text{ if } k v_n < 1$$

$$b_n = 1 \text{ if } k v_n < 1 \quad (7)$$

In other embodiments, the processing system 110 may apply or not apply the jitter force filter based on the input parameters including velocity and force response. For example, responsive to determining that the velocity $v_n$ is more than a threshold value and that the force response $f_n$ is more than another threshold value, the processing system 110 may process the current force sensor data similar to the previously filtered force sensor data (i.e., $f_n = f_{n-1}$). Responsive to determining that the velocity $v_n$ is more than a threshold value and that the force response $f_n$ is less than another threshold, the processing system may apply the jitter force filter as described above. Responsive to determining that the velocity of the force input object has changed from fast to slow or stops moving, the processing system 110 may apply the jitter force filter on the force sensor data to ensure that the force response is not suddenly dropped or does vary beyond a predetermined value.

Furthermore, while the present implementation describes a jitter force filter that uses a linear function based on the movement of the input object, other embodiments may utilize a jitter force filter that corresponds to a non-linear function based on the movement of the input object, such step functions, logarithmic functions, exponential functions, and other types of relationships. For example, in embodiments where the jitter force filter corresponds to a step function, a certain amount of the jitter filter is applied to force sensor data at each different level of speed, direction, and/or velocity; more filtering is applied at each successive step.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A method of operating a sensing device having a plurality of sensor electrodes, the method comprising:
   acquiring position sensor data and force sensor data using at least one of the plurality of sensor electrodes, wherein the position sensor data indicates a position of an input object in contact with the sensing device;
   determining a position of the input object based at least in part on the position sensor data;
   applying a jitter force filter to modify the force sensor data, wherein a weighting of the jitter force filter is based at least in part on the position of the input object; and
   determining a force of the input object based on the modified force sensor data.

2. The method of claim 1, further comprising:
   determining the weighting for the jitter force filter based at least in part on one or more locations within an input region of the sensing device from which the force sensor data is acquired.

3. The method of claim 1, further comprising:
   determining the weighting for the jitter force filter based at least in part on a contact location of the input object with respect to an input region of the sensing device.

4. The method of claim 3, wherein a first contact location is proximate to an edge of the input region and a second contact location is proximate to a center of the input region and the weighting for the jitter force filter varies between the first and second contact locations.

5. The method of claim 1, further comprising:
   determining the weighting for the jitter force filter based on a rate of change in the force sensor data.

6. The method of claim 1, further comprising:
   determining the weighting for the jitter force filter based on a movement of the input object.

7. The method of claim 6, wherein the movement of the input object comprises at least one selected from the group consisting of velocity, speed, and direction.

8. The method of claim 1, wherein the position sensor data is provided by capacitive sensor electrodes, the force sensor data is provided by force sensor electrodes, and the position sensor data is separate from the force sensor data.

9. The method of claim 1, further comprising:
   determining a movement of the input object in contact with the sensing device based at least in part on the position sensor data,
   wherein the weighting of the jitter force filter is based at least in part on the movement of the input object.

10. An input device comprising:
    a plurality of sensor electrodes;
    a processing system coupled to the plurality of sensor electrodes, wherein the processing system is configured to:
    acquire capacitive sensor data and force sensor data using at least one of the plurality of sensor electrodes, wherein the capacitive sensor data indicates a position of an input object in contact with the input device;
    determining a position of the input object based at least in part on the capacitive sensor data;
    apply a jitter force filter to modify at least a portion of the force sensor data, wherein a weighting of the jitter force filter is based at least in part on the position of the input object; and
    determine a force of the input object based on the modified force sensor data.

11. The input device of claim 10, wherein the processing system is further configured to determine a weighting for the jitter force filter that varies based on a contact location within an input region of the input device.

12. The input device of claim 10, wherein the processing system is further configured to determine the weighting for the jitter force filter based at least in part on a contact location of the input object with respect to an input region of the input device.

13. The input device of claim 12, wherein a first contact location is proximate to an edge of the input region and a second contact location is proximate to a center of the input region and the processing system is further configured to determine a weighting for the jitter force filter that varies between the first and second contact locations.

14. The input device of claim 10, wherein an input region of the input device comprises a plurality of regions, and wherein the processing system is further configured to determine a weighting for the jitter force filter based at least in part on a first region of the plurality of regions.

15. The input device of claim 10, wherein the plurality of sensor electrodes includes a first sensor electrode configured for force sensing, and
wherein the processing system is further configured to determine a weighting for the jitter force filter that varies based on proximity of a contact location to the first sensor electrode.

16. The input device of claim 10, wherein the processing system is further configured to determine a weighting for the jitter force filter based on a movement of the input object.

17. A processing system for a sensing device, the processing system comprising:
sensor circuitry coupled to a plurality of sensor electrodes, the sensor circuitry configured to acquire position sensor data and force sensor data using at least one of the plurality of sensor electrodes, wherein the position sensor data indicates a position of an input object in contact with the sensing device,
wherein the processing system is configured to:
determine a position of the input object based at least in part on the position sensor data;
apply a jitter force filter to modify at least a portion of the force sensor data, wherein a weighting of the jitter force filter is at least partially based on the position of the input object; and
determine a force of the input object based on the modified force sensor data.

18. The processing system of claim 17, wherein the processing system is further configured to determine a weighting for the jitter force filter that varies based on a contact location within an input region of the sensing device.

19. The processing system of claim 17, wherein an input region of the sensing device comprises a plurality of regions, and wherein the processing system is further configured to determine a weighting for the jitter force filter based at least in part on a first region of the plurality of regions.

20. The processing system of claim 17, wherein the processing system is further configured to determine a weighting for the jitter force filter based on a movement of the input object.

* * * * *